US008888427B2

(12) United States Patent
Ruppert et al.

(10) Patent No.: US 8,888,427 B2
(45) Date of Patent: Nov. 18, 2014

(54) SYSTEM FOR PREVENTING ROTATION OF FASTENERS

(75) Inventors: Rex L. Ruppert, Benson, MN (US); John Paul Honermann, Benson, MN (US); Charles D. O'Connell, Willmar, MN (US)

(73) Assignee: CNH Industrial America LLC, New Holland, PA (US)

( * ) Notice: Subject to any disclaimer, the term of this patent is extended or adjusted under 35 U.S.C. 154(b) by 96 days.

(21) Appl. No.: 13/559,205

(22) Filed: Jul. 26, 2012

(65) Prior Publication Data
US 2014/0030040 A1 Jan. 30, 2014

(51) Int. Cl.
*F16B 39/10* (2006.01)

(52) U.S. Cl.
CPC .................................. *F16B 39/101* (2013.01)
USPC .............................. 411/102; 411/87; 411/120

(58) Field of Classification Search
USPC .................. 411/87, 92, 93, 96, 102, 119, 120
See application file for complete search history.

(56) References Cited

U.S. PATENT DOCUMENTS

| 607,741 | A |   | 7/1898 | Gardner |        |
|---------|---|---|--------|---------|--------|
| 653,043 | A | * | 7/1900 | Strand  | 411/120 |
| 880,930 | A | * | 3/1908 | Stillwell | 411/120 |
| 2,626,837 | A | * | 1/1953 | Wilson et al. | 301/35.624 |
| 4,529,346 | A | * | 7/1985 | Aubel et al. | 411/117 |
| 4,657,457 | A |   | 4/1987 | Rickwood |    |
| 4,940,374 | A |   | 7/1990 | Gallagher |    |
| 7,300,237 | B2 |  | 11/2007 | Illedits et al. |  |
| 7,708,509 | B1 |  | 5/2010 | Bennett |     |
| 7,927,049 | B2 | * | 4/2011 | Adams | 411/102 |
| 8,337,129 | B2 | * | 12/2012 | Boyce et al. | 411/102 |
| 2002/0031416 | A1 | * | 3/2002 | Illes et al. | 411/87 |

FOREIGN PATENT DOCUMENTS

| GB | 225149 | 11/1924 |
| GB | 538313 | 7/1941 |

* cited by examiner

*Primary Examiner* — Flemming Saether
(74) *Attorney, Agent, or Firm* — Rebecca L. Henkel

(57) ABSTRACT

A system for preventing rotation of fasteners is provided that includes secondary locking devices. The system may include multiple fasteners that extend parallel to each other and may be arranged in a generally circular pattern. Multiple secondary locks may be arranged concentrically outside of the fasteners and have radially extending teeth so that teeth of adjacent secondary locks engage each other for preventing rotation of the fasteners. The secondary fasteners may have central openings that are larger than the fasteners to allow for substantial back-and-forth rotational movement, which may be between about 5 to 20 degrees of travel, of the secondary locks upon the fasteners before being stopped by the engagements of the secondary locks and fasteners. Inner and outer peripheral surfaces of the secondary locks may have different axes of symmetry which may allow the secondary lock teeth to be arranged asymmetrically relative to the fasteners.

16 Claims, 4 Drawing Sheets

SYSTEM FOR PREVENTING ROTATION OF FASTENERS

BACKGROUND OF THE INVENTION

The present invention relates generally to fasteners, and more particularly to a system for preventing rotation of fasteners by way of secondary locking devices that are used with fasteners in tight installation quarters without much room around the fasteners.

Secondary locking devices that are used to prevent rotation of fasteners are known. Some fasteners themselves are configured to resist rotation, such as nuts with nylon inserts in their threads. Liquid thread-locking products are available. These may be particularly well-suited for use with relatively small fasteners that do not see a lot of in-use vibration and do not require large holding torques of the fasteners. Other ancillary or secondary holding devices have been used with relatively large fasteners. Agricultural implementations of washers with bendable tabs are known. One example is for locking bolts in a circular pattern on a steering plate of a floater-style sprayer tractor in which washers that have bendable fingers are used. The washers are set over the bolts with the fingers extending outwardly from the circular bolt pattern. A disk is placed on top of the bolts and the fingers are bent 180 degrees over the disk so that they grasp the disk, which prevents rotation of the washers and the corresponding bolts.

SUMMARY OF THE INVENTION

The present invention is directed to a system for preventing rotation of fasteners. The system may include multiple fasteners and multiple secondary locks that can be installed on the fasteners in tight installation quarters without much room around the fasteners. This may allow for mechanically locking the fasteners to prevent their rotation when the fasteners are arranged below and closely adjacent surfaces of a component that is being secured by way of the fasteners, without having to bend part(s) of the secondary lock. Instead, an interlocking arrangement of secondary locks may be adjustably provided upon fasteners so as to ensure that the secondary locks engage with each other regardless of the particular rotational positions of the fasteners upon which the secondary locks are arranged. Each secondary lock may have its position adjusted by moving it to a different discrete rotational position upon the fastener for relatively large adjustments, rotationally clocking as permitted by a purposeful larger clearance(s) between the secondary lock and fastener for relatively small adjustments, and flipping the secondary lock upside down as another way of adjusting, to allow multiple secondary locks to engage with each other regardless of rotational positions of the fasteners upon which the secondary locks are arranged.

According to an aspect of the invention, a system is provided for preventing rotation of fasteners. The system includes multiple fasteners for securing at least two components to each other. The multiple fasteners may extend parallel to and be spaced from each other. The fasteners may be arranged in a generally circular pattern. Each of the multiple fasteners may have a fastener head that includes a fastener head lower surface that faces toward at least one of the at least two components. Multiple secondary locks engage the fasteners so that each of the secondary locks is arranged concentrically outside of a respective one of the fasteners. Each of the secondary locks may include a main body and a lock central opening that extends through the main body, the lock central opening having a width that is greater than the maximum width of the fastener head so that the fastener head can be held within the lock central opening. Each of the multiple secondary locks may include a lower surface that may be arranged substantially parallel to the lower surface of the fastener head. The lower surfaces of the secondary locks may be coplanar with, above, or below the lower surfaces of the fastener heads depending on the particular arrangement of the secondary locks relative to the fastener heads and the arrangement of the fastener heads relative to other components in the assembly. Multiple teeth extend from a central axis of the secondary lock in a radial direction, such that teeth of adjacent pairs of the multiple secondary locks engage each other so as to prevent rotation of the multiple fasteners. This may allow the secondary locks to be installed by dropping the secondary locks over the fastener heads from above, inserting from below, or otherwise installing depending on the relative orientation of the components, without requiring a lot of space next to the fasteners for manually manipulating the secondary lock into a locked position. This may also provide adjustable and infinitely variable tooth projection pattern(s) or facing angle(s) of the secondary locks relative to respective fasteners and may provide a system that has secondary locks which can be installed from above (or below) fasteners within tight lateral constraints. This may also provide a system in which the sole anti-rotational locking engagements provided between respective secondary locks, without bending portions of the secondary locks or other ancillary bending components to engage other components of the system, may define a purely stacked or layered configuration which may eliminate a need for bendable components.

In accordance with another aspect of the invention, the system may include a retaining ring that has a lower surface that engages upper surfaces of all of the multiple secondary locks so that the retaining ring prevents upward movement of the multiple secondary locks along longitudinal axes of the multiple fasteners. The retaining ring may overlie all of the secondary locks in their entireties. Portions of some of the teeth of the secondary locks may extend outwardly beyond the retaining ring such that less than one-half of the length of each of the teeth of the secondary locks extends outwardly beyond the retaining ring. This may allow secondary locks to be installed by dropping or placing the secondary locks over the fastener heads from above or otherwise, without requiring a step of bending part of the secondary lock to engage another component, which may avoid bending-induced fatigue of the secondary lock.

In accordance with another aspect of the invention, the lock inner peripheral surface includes an even number of flat wall segments and the lock outer peripheral surface may include an odd number of teeth. In this way, groups of teeth that are radially aligned with each of the flat wall segments of the lock inner peripheral surface are arranged differently than groups of teeth that are radially aligned with adjacent flat wall segments on opposing sides. This provides a different tooth projection pattern between any pair of secondary lock segments defined by adjacent flat wall segments. This may allow for changing the tooth positions of a secondary lock that are presented to adjacent secondary locks by removing the secondary lock from the fastener head and rotating the secondary lock to advance or regress the relative position of the secondary lock upon the fastener which may provide positional adjustability while trying to arrange multiple secondary locks that are required to engage each other upon multiple fasteners.

In accordance with another aspect of the invention, a lock inner peripheral axis of symmetry, about which a lock inner peripheral surface is symmetrical, is defined between an opposing pair of lock inside corners of the inner peripheral surface. A lock outer peripheral axis of symmetry, about which the lock outer peripheral surface is symmetrical, is defined through the secondary lock. The lock inner and outer peripheral axes of symmetry are different from each other. This may allow for presenting differently arranged groups of teeth relative to the flat wall segments of the lock inner peripheral surface, which may provide positional adjustability for presenting teeth in different directions while assembling the system.

In accordance with another aspect of the invention, a lock central opening that is provided in a central portion of the secondary lock is defined inwardly of the flat wall segments of the lock inner peripheral surface. The lock central opening may define a minimum width that is greater than a maximum width of a fastener head arranged within the lock central opening. This may provide a continuous gap between the lock inner peripheral surface and the fastener head when in a resting or neutral position in which fastener outside corners and flat sides of the fastener head are aligned with and spaced from corresponding lock inside corners and flat wall segments of the lock inner peripheral surface. The gap may be sufficiently large to allow for substantial back and forth rotational movement of the secondary lock upon the fastener head. The secondary lock may rotate between about 5 to 20 degrees of travel, or at least about one-half of a width of one of the teeth, to sweep between a counterclockwise clocked position and a clockwise clocked position, both of which define positions at which the rotation of the secondary lock is mechanically stopped by engagement of the fastener head and the secondary lock. This may provide sufficient slop or play in the joint of the secondary lock and the fastener which may allow for positional adjustability tooth presentation directions while assembling the system.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION

Figure 1:
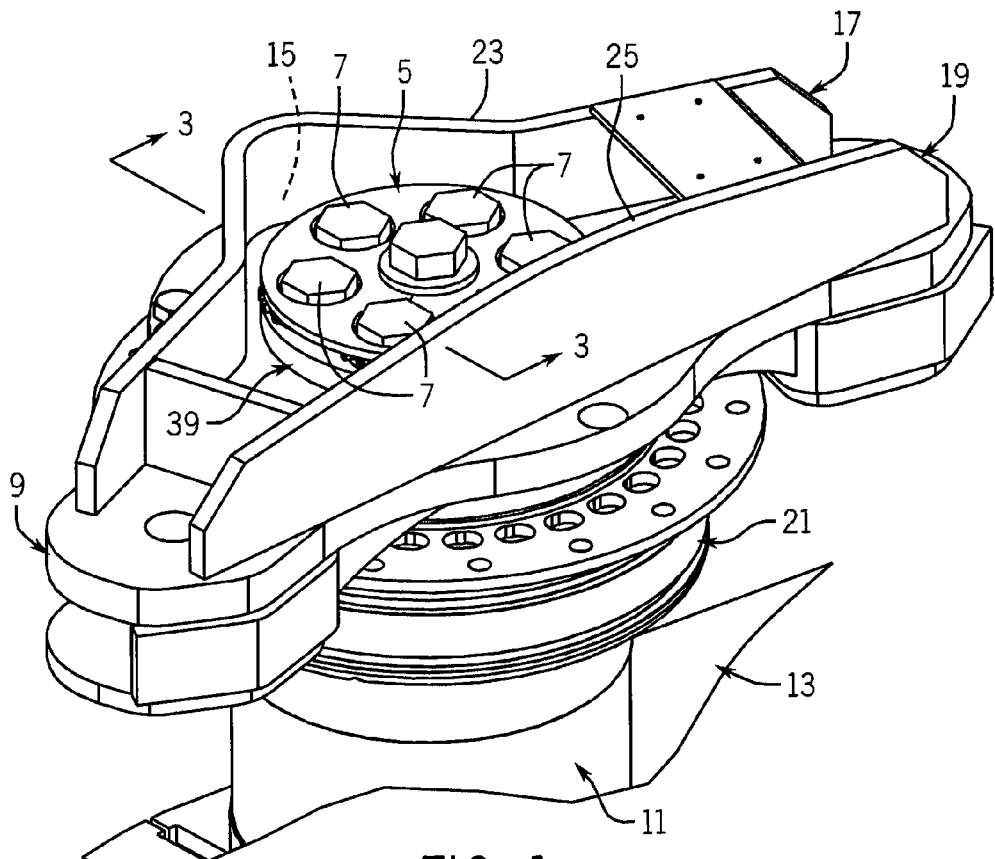
FIG. 1 is an isometric view of a system for preventing rotation of fasteners according to the invention.

Referring to FIG. 1, a system 5 for preventing rotation of fasteners 7 is provided. The fasteners 7 are shown as bolts holding steering components together, securing a steering arm 9 to a steering kingpin 11 that is connected to a steering fork 13, such as that implemented on a TITAN™ series floater application tractor available from Case IH. It is understood that the system 5 may be implemented on other applications that require locking of at least two closely adjacent fasteners 7.

Still referring to FIG. 1, the system 5 is arranged within a cavity 15 of the steering fork 13 that is defined between front and back support walls 17, 19 that are transversely spaced by relatively small distances from the fasteners 7 that extend into a top end 21 (FIG. 2) of the steering kingpin 11. The entire system 5 is arranged below upper edges 23, 25 of the front and back support walls 17, 19 such that transverse access to the system 5 is substantially restricted.

Figure 2:
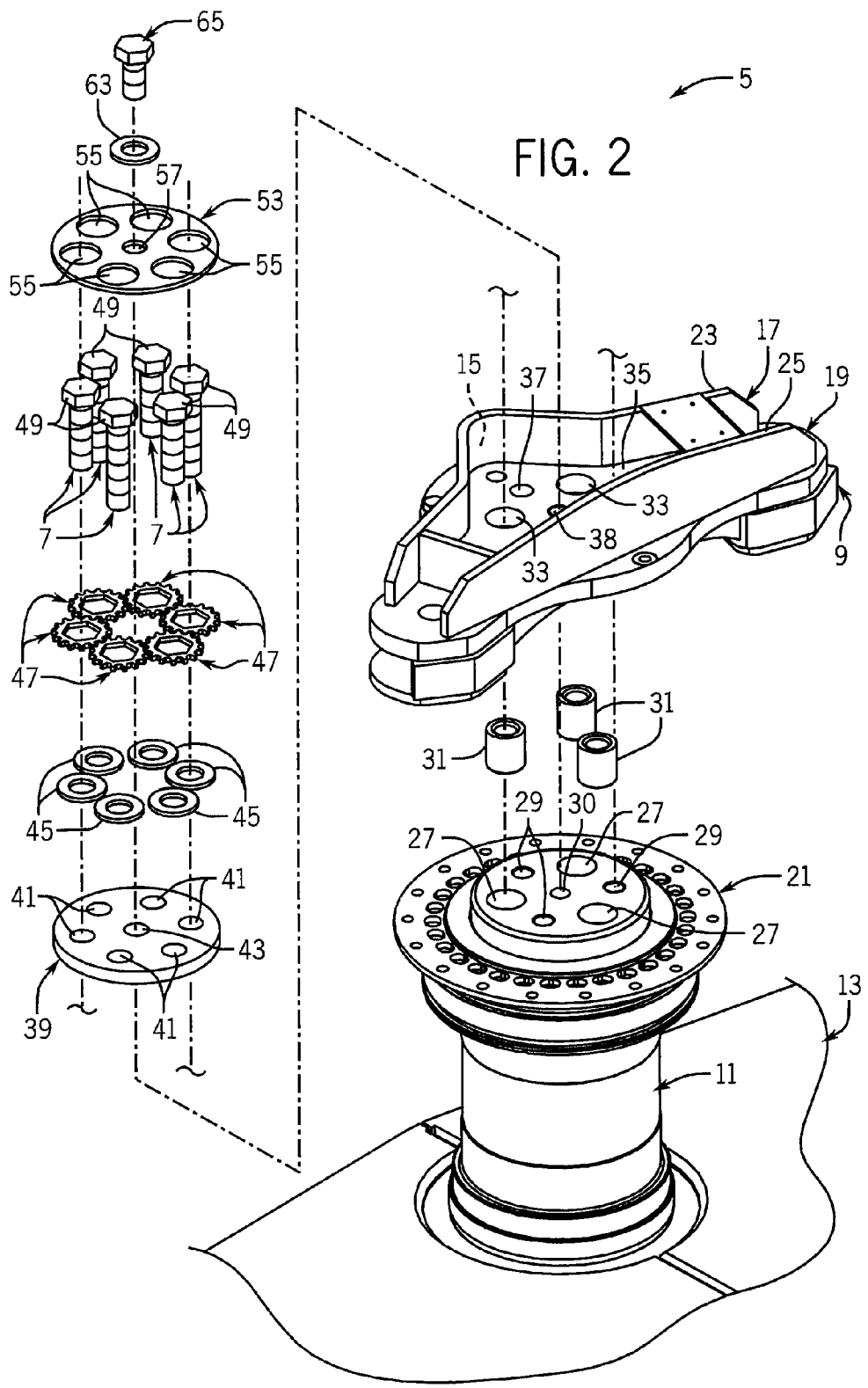
FIG. 2 is an exploded isometric view of the system of FIG. 1.

Referring now to FIG. 2, in a representative application, the system 5 may be used with components being fastened that are arranged so that the system 5 components can be installed from above. It is understood that the components being fastened may be arranged so that the system 5 components can be installed from below, from the side, or otherwise, even in tight quarters, depending on the relative orientation of the components being fastened in a particular application. As shown in FIG. 2, bores 27, 29 extend into the top end 21 of the steering kingpin 11, at an outer portion of the steering kingpin 11. A central bore 30 extends into the steering kingpin 11, which is aligned with a central axis of the steering kingpin 11. The bores 27 have larger diameters than bores 29 and hold cylindrical alignment bushings 31 that have central bores through which respective fasteners 7 extend. Bores 29 receive the fasteners 7 without alignment bushings 31. The alignment bushings 31, when seated in the bores 27, extend upwardly beyond the steering kingpin top end 21 and fit into holes 33 in a bottom wall 35 of the steering arm 9. This ensures registration of the steering arm 9 upon the steering kingpin 11 so that the bores 27 align with holes 33 and the bores 29 align with other, relatively smaller diameter, holes 37 through which the fasteners 7 extend to threadedly engage the steering kingpin 11. A central hole 38 extends through a central portion of the steering arm bottom wall 35.

Still referring to FIG. 2, a stiffener ring 39 is arranged in the cavity 15 so that a lower surface of the stiffener ring 39 sits on top of an upper surface of the steering arm bottom wall 35. The stiffener ring 39 provides an extra layer of material and thus supplements rigidity of the steering arm bottom wall 35 where the bottom wall may be subjected to large bending forces. The stiffener ring 39 is generally flat and has a circular perimeter shape. Holes 41 extend through the stiffener ring 39 and are spaced from each other and arranged in a generally circular pattern at an outer portion of the stiffener ring 39 and a central hole 43 extends through the stiffener ring 39 at its central axis. The holes 41 align with respective ones of the bores 27, 29 of the steering kingpin 11 and the holes 33, 37 of the steering arm 9. Central hole 43 aligns with the central hole 38 and central bore 30 of the steering arm 9 and steering kingpin 11.

Still referring to FIG. 2, washers 45 sit on top of an upper surface of the stiffener ring 39. The washers 45 are spaced from each other so that respective openings of the washers align with the holes 41 of the stiffener ring 39. Upper surfaces of the washers 45 present flat surfaces that support toothed gear-washers as secondary locks 47 and fastener heads 49 from below, with the fastener heads 49 arranged concentrically within the secondary locks 47, as explained in greater detail elsewhere herein. In this way, the fasteners 7 extend through the washers 45, holes 41 of stiffener ring 39, holes 33, 37 of steering plate 9, bushings 31, and into the bores 27, 29 of the top end 21 of the kingpin 11.

Figure 3:
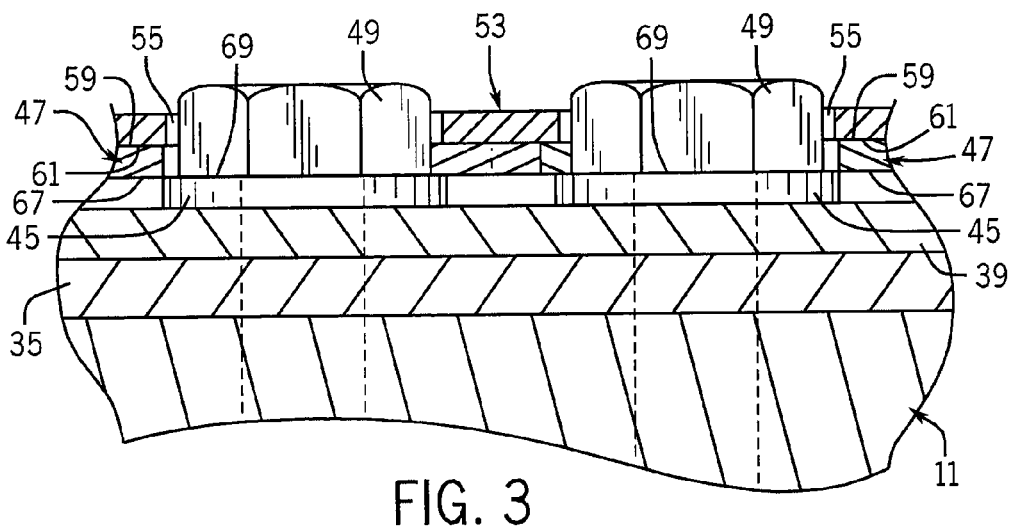
FIG. 3 is a cross-sectional view of portions of the system of FIG. 1.

Still referring to FIG. 2, a retaining ring 53 sits on top of and mechanically captures the secondary locks 47 from above. Holes 55 extend through the retaining ring 53 and are arranged in a generally circular pattern toward an outer portion of the retaining ring 53 and a central hole 57 extends through the retaining ring 53, along a central axis of the retaining ring 53. Referring to FIG. 3, the holes 55 have diameters that are larger than widths of the fastener heads 49 but narrower than widths of the secondary locks 47 so that the fastener heads 49 fit inside of the holes 55 while a lower surface 59 of the retaining ring 53 abuts an upper surface 61 of each of the secondary locks 47. Referring again to FIG. 2, a washer 63 sits below a fastener 65, which is shown as a bolt. The fastener 65 extends through the washer 63 and the central holes 57, 43 of the retaining and stiffener rings 53, 39, and into and threadedly engages the central bore 30 of the steering kingpin 11. With the fastener 65 secured to the steering kingpin 11, the secondary locks 47 are sandwiched between the retaining ring 53 and the washers 45 or other flat surface so that lower surfaces 67 of the secondary locks 47 are arranged parallel to, being coplanar in this exemplary embodiment, with lower surfaces 69 of the fastener heads 49 (FIG. 3). The retaining ring 53 may overlie all of the secondary locks 47 in their entireties or may overlie nearly all of each of the secondary locks 47 (FIG. 1) without any portions of the secondary locks 47 bent into engagement with an upper surface of the retaining ring 53.

Figure 4:
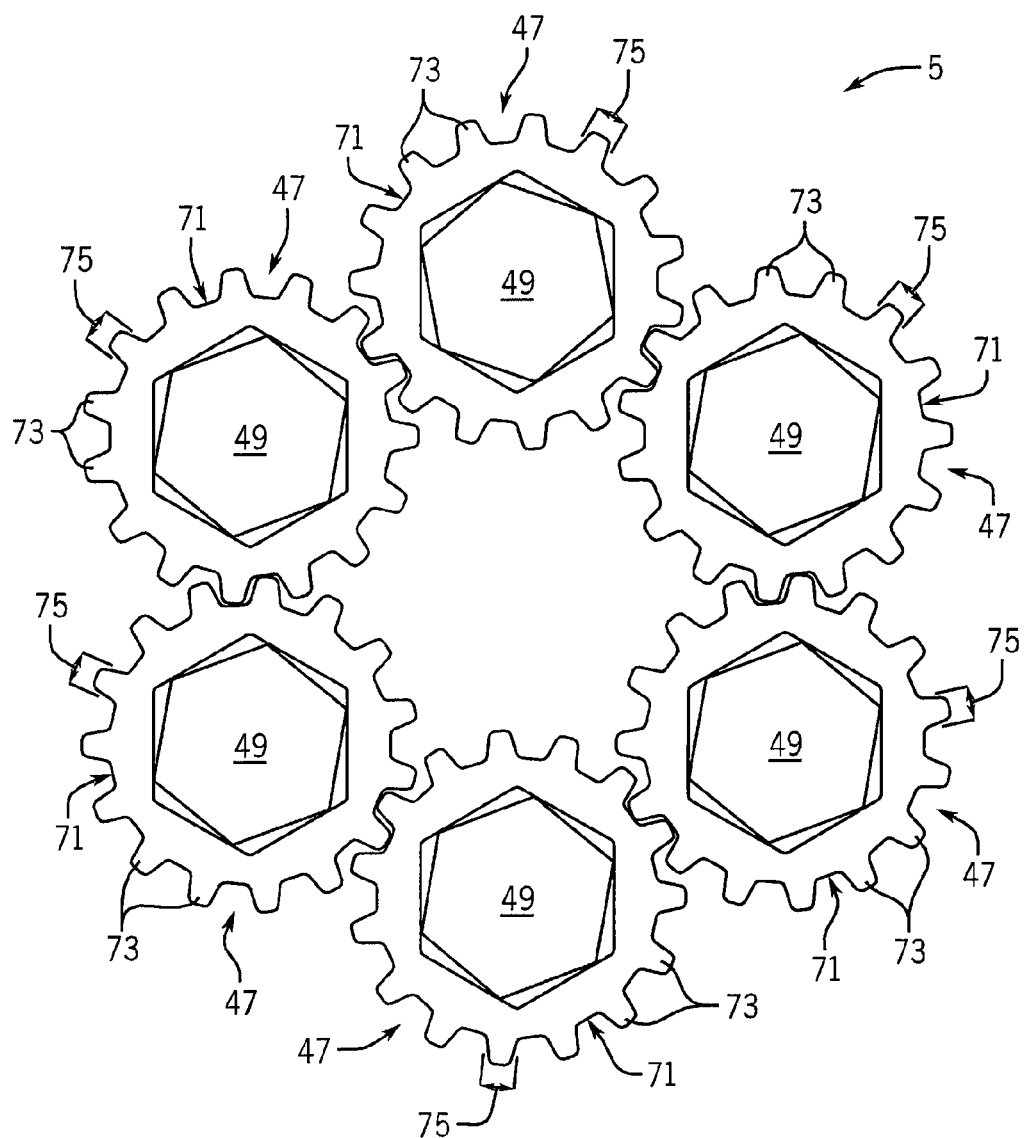
FIG. 4 is a simplified top plan view of secondary locks and fasteners of the system of FIG. 1.

Referring now to FIG. 4, the fasteners 7 are arranged in a generally circular pattern. The secondary locks 47 upon the respective fasteners 7 are also arranged in a generally circular pattern and engage each other so as to prevent rotation of the fasteners 7. That is because each fastener 7 and its secondary lock 47 act as an intermediate fastener 7 and secondary lock 47 that are sandwiched in cooperation between an outer pair of adjacent fasteners 7 and secondary locks 47 that engage the intermediate fastener 7 and secondary lock 47 from opposing sides. Rotating the intermediate fastener 7 and secondary lock 47 in a loosening direction forces the pair of outer fasteners 7 and secondary locks 47 to rotate in a tightening direction, which provides a resistance that is sufficient to prevent the loosening rotation of the intermediate fastener 7 and secondary lock 47. The same counter-rotating resistance is provided between any two adjacent sets of fasteners 7 and secondary locks 47.

Still referring to FIG. 4, each secondary lock 47 includes a main body that has an outer peripheral surface 71 that includes multiple teeth 73 extending from a central axis (not shown) of the secondary lock 47 in a radial direction. Each secondary lock 47 may be made from a metallic material and that has a thickness that is selected based on strength and torque-holding requirements for teeth 7. For example, the secondary lock 47 may be made from 7-gauge AISI 1010 steel, ¼-inch ASTM A572 grade 50 steel, or other materials and thicknesses depending on the particular end-use requirements. Each tooth 73 defines a tooth width 75 between furthest spaced-apart portions of opposing side walls of the tooth 73 that are connected to each other by an end wall of the tooth 73. Spaces between adjacent teeth 73 on each secondary lock 47 are sized to receive teeth 73 of adjacent secondary locks 47, whereby adjacent secondary locks 47 engage each other through intermeshing contact of their respective teeth 73 as a gear train that locks and prevents rotation of the fasteners 7.

Figure 5:
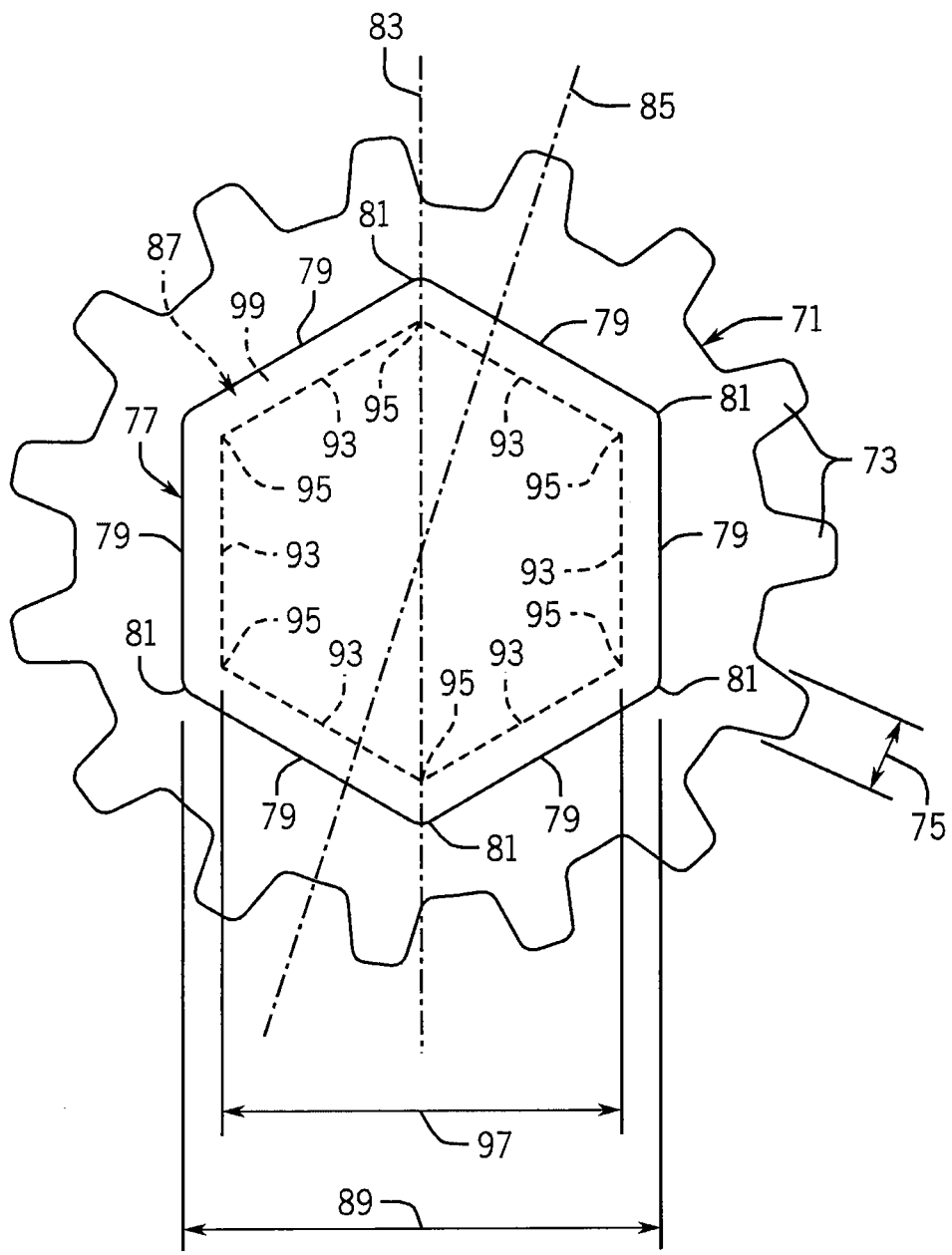
FIG. 5 is a simplified plan view of a secondary lock of the system of FIG. 1.

Referring now to FIG. 5, the main body of each secondary lock 47 has an inner peripheral surface 77 that includes flat wall segments 79 that are interconnected with each other at lock inside corners 81. The inner peripheral surface 77 has a number of flat wall segments 79 and lock inside corners 81 that correspond to the number of flat sides and points or corners on the fastener head 49. For example, when used with a four-point fastener head 49, the secondary lock 47 may have four flat wall segments 79 and four lock inside corners 81. When used with a six-point fastener head 49, the secondary lock 47 may have six flat wall segments 79 and six inside corners 81. When used with an eight-point fastener head 49, the secondary lock 47 may have sixteen flat wall segments 79 and sixteen inside corners 81. When used with a twelve-point fastener head 49, the secondary lock 47 may have twenty-four flat wall segments 79 and twenty-four inside corners 81. The secondary locks 47 of FIG. 5 are shown with six flat wall segments 79 and six inside corners 81 and are being used with six-point fastener heads 49.

The outer peripheral surface 71 may have an odd number of teeth 73, shown with 15 teeth, each of which is shown as being about a 16-pitch gear tooth. The secondary lock 74 may include other combinations of even and odd flat wall segments 79 and teeth 73. For example, instead of fifteen teeth 73 as shown, the outer peripheral surface 71 may instead have fewer teeth 73 such as even or odd numbers of teeth 73 between about four and fourteen. The outer peripheral surface 71 may have more teeth 73 than shown, such as even or odd numbers of teeth 73 between about sixteen and thirty-five or more. The particular number of teeth 73 and the respective pitch of the teeth 73 are selected depending at least in part on how many teeth should engage each other for a particular application.

Still referring to FIG. 5, in this embodiment, an odd number of teeth 73 at the outer peripheral surface 71 extends away from an even number of flat wall segments 79 at the inner peripheral surface 77. In this arrangement, groups of teeth that are radially aligned with each of the flat wall segments 79, each group being at least partially within imaginary boundary lines projected perpendicularly from the ends of the flat wall segments 79 and extending through the outer peripheral surface 71, are arranged differently than groups of teeth 73 that are radially aligned with adjacent flat wall segments 79 on opposing sides. The odd number of teeth 73 at the outer peripheral surface 71 and the even number of flat wall segments 79 of the inner peripheral surface 77 present a lock inner peripheral axis of symmetry 83 that is defined between an opposing pair of lock inside corners 81 that is different from a lock outer peripheral axis of symmetry 85 that extends centrally through a tooth 73 at one side of the secondary lock 47 and between a pair of adjacent teeth 73 at an opposing side of the secondary lock 47. Accordingly, a different tooth projection pattern between any two adjacent groups of teeth 73 are aligned with adjacent flat wall segments 79 of the secondary lock. This allows for relatively large adjustments to the tooth projection pattern or facing angle(s) of the secondary lock 47 relative to the fastener 7 by repositioning the secondary lock 47 in discrete rotational positions that advance or regress the secondary lock 47 in 60-degree increments, for embodiments of secondary locks 47 with six flat wall segments 79, and for each one of the flat wall segments 79 that is advanced or regressed relative to the fastener 7. The secondary lock 47 can also be flipped upside down to provide further options for adjusting the tooth pattern or facing angle(s) that is presented from any segment(s) of the secondary lock 47 to ensure its engaging fit with adjacent secondary locks 47.

Still referring to FIG. 5, a lock central opening 87 is defined through a central portion of the main body of the secondary lock 47, with an outer boundary defined by the inner peripheral surface 77. The lock central opening 87 defines a minimum width 89. Fastener head 49 includes flat sides 93 that are interconnected at fastener outside corners 95 and fits inside of the lock central opening 87 because a maximum width 97 of the fastener head 49 is smaller than the minimum width 89 of the lock central opening 87. This provides a continuous gap 99 between the lock inner peripheral surface 77 and the fastener head 49 when in a resting or neutral position in which fastener outside corners 95 and flat sides 93 of the fastener head 49 are aligned with and spaced from corresponding lock inside corners 81 and flat wall segments 79 of the lock inner peripheral surface 77.

Still referring to FIG. 5, the fastener head 49 shown in phantom outline is in the neutral position within the lock central opening 87. The gap 99 is sufficiently large to allow for substantial back and forth rotational movement of the secondary lock 47 upon the fastener head 49. A particular amount of back and forth rotational movement permitted by the gap 99, and thus the size of the gap 99, can be selected based at least in part on the configuration of the fastener head 49. That is, the size of the gap 99 may be selected based at least in part on whether the fastener head 49 has a four, six, eight, or twelve-point head, so as to provide the desired amount of back and forth rotational movement without allowing the fastener head 49 to completely rotate 360 degrees within the secondary lock. In one embodiment, the secondary lock 47 may rotate between about 5 to 20 degrees of travel of the tip end or end wall of the teeth 73, or at least about one-half of the tooth width 75, to sweep between a counterclockwise clocked position and a clockwise clocked position. At each of the counterclockwise and clockwise clocked positions, the rotation of the secondary lock 47 is mechanically stopped by the engagement of the fastener head 49 and the secondary lock 47. In this way, the gap 99 provides a purposeful large clearance and sufficient slop or play in the joint of the secondary lock 47 and the fastener 7 so as to accommodate fasteners of different specification, for example, both DIN and ISO type fasteners, and allow positional adjustability of the tooth projection pattern of the secondary lock 47 relative to the fastener 7. Referring again to FIG. 4, the secondary lock 47 at the top is shown in a clockwise clocked position upon the fastener head 49.

Referring again to FIG. 4, from the neutral position (FIG. 5), the secondary lock 47 has been rotated clockwise upon the secondary lock 47 until various fastener outside corners 95 engage the flat wall segments 79 of the inner peripheral surface 77. The fastener outside corners 95 engage the flat wall segments 79 at locations that are spaced from and to the left of the nearest adjacent lock inside corners 81, preferably, at least some of the fastener outside corners 95 and corresponding adjacent lock inside corners 81 being spaced by distances that are at least one-half of the tooth width 75. From the neutral position (FIG. 5), the secondary lock 47 has been rotated counterclockwise upon the secondary lock 47 until various fastener outside corners 95 engage the flat wall segments 79 of the inner peripheral surface 77. The fastener outside corners 95 engage the flat wall segments 79 at locations that are spaced from and to the right of the nearest adjacent lock inside corners 81, preferably, at least some of the fastener outside corners 95 and corresponding adjacent lock inside corners 81 being spaced by distances that are at least one-half of the tooth width 75.

The adjustability of the position of each secondary lock 47 relative to the fastener 7 provided by the gap 99 along with rotationally advancing or regressing the secondary lock 47 up the fastener head 49 to present different arrangements of tooth groups in different directions, and/or flipping over one or more of the secondary locks 47, allows the system 5 to interlock the secondary locks 47 with each other regardless of the particular position of the fastener heads 49 relative to each other.

Many changes and modifications could be made to the invention without departing from the spirit thereof. The scope of these changes will become apparent from the appended claims.

The invention claimed is:

1. A system for preventing rotation of multiple fasteners for securing at least two components to each other, the multiple fasteners extending parallel to and spaced from each other and arranged in a generally circular pattern, each of the multiple fasteners having a fastener head that defines a fastener head maximum width, the system comprising:
   multiple secondary locks that engage the multiple fasteners so that each of the multiple secondary locks is arranged concentrically outside of a respective one of the multiple fasteners, each of the multiple secondary locks including,
      a main body and a lock central opening that extends through the main body, the lock central opening having a width that is greater than the fastener head maximum width and wherein the fastener head is held within the lock central opening; and
      multiple teeth that extend from a central axis of the secondary lock in a radial direction, such that teeth of adjacent pairs of the multiple secondary locks engage each other so as to prevent rotation of the multiple fasteners.

2. The system of claim 1 further comprising a retaining ring that has a lower surface that engages upper surfaces of all of the multiple secondary locks so that the retaining ring prevents upward movement of the multiple secondary locks.

3. The system of claim 2 wherein the retaining ring overlies all of the secondary locks in their entireties.

4. The system of claim 2 wherein portions of some of the teeth of the secondary locks extend outwardly beyond the retaining ring such that less than one-half of the length of each of the teeth of the secondary locks extends outwardly beyond the retaining ring.

5. The system of claim 2 further comprising a retaining ring bolt that extends through the retaining ring to maintain the engagement of the lower surface of the retaining ring against the upper surfaces of the multiple secondary locks.

6. The system of claim 5 wherein the multiple fasteners extend into an end of a steering kingpin.

7. The system of claim 6 wherein the retaining ring bolt extends into the end of the steering kingpin.

8. The system of claim 1 further comprising multiple washers that support respective pairs of the multiple fasteners and secondary locks such that each of the multiple washers supports one of the multiple fasteners and a respective one of the multiple secondary locks from below.

9. The system of claim 8 wherein the multiple secondary locks have maximum widths that are greater than maximum widths of the multiple washers such that the multiple teeth of the multiple secondary locks extend outwardly beyond the multiple washers.

10. The system of claim 1 wherein each of the multiple secondary locks includes a lock inner peripheral surface having multiple flat wall segments that are interconnected with each other at multiple lock inside corners, and that defines a lock inner peripheral axis of symmetry that extends through a pair of the lock inside corners on opposing sides of the secondary lock, and a lock outer peripheral surface that is defined at least in part by the multiple teeth and that defines a lock outer peripheral axis of symmetry that is different from the lock inner peripheral axis of symmetry.

11. The system of claim 1 wherein each of the multiple secondary locks includes a lock inner peripheral surface that has multiple interconnected flat wall segments that extend about a lock central opening that is provided in a central portion of the secondary lock, the lock inner peripheral surface defining a minimum width of the lock central opening that is greater than a maximum width of the fastener head so that the secondary lock can be rotationally clocked back and forth upon the fastener head so as to sweep a distance that is greater than one-half of a width of each of the multiple teeth of the secondary lock.

12. The system of claim 1 wherein the fastener head defines a fastener head maximum width and the fastener head includes multiple flat sides that are interconnected at multiple fastener outside corners, and wherein each of the multiple secondary locks includes a lock inner peripheral surface that has multiple flat wall segments that are interconnected at multiple lock inside corners, the flat wall segments of the lock inner peripheral surface extending about a lock central opening that is provided in a central portion of the secondary lock, the lock inner peripheral surface defining a minimum width of the lock central opening that is greater than the fastener head maximum width so that the secondary lock can be rotated upon the fastener head such that at least one of the lock inside corners is misaligned with an adjacent, relatively nearest one of the fastener outside corners by a distance that is greater than one-half of a width of each of the multiple teeth of the secondary lock.

13. The system of claim 1 further comprising a retaining ring that has a lower surface that engages upper surfaces of all of the multiple secondary locks so that the retaining ring prevents upward movement of the multiple secondary along longitudinal axes of the multiple fasteners.

14. The system of claim 13 wherein portions of some of the teeth of the secondary locks extend outwardly beyond the retaining ring such that less than one-half of the length of each of the teeth of the secondary locks extends outwardly beyond the retaining ring.

15. A system for preventing rotation of multiple fasteners extending parallel to and spaced from each other, each of the multiple fasteners including a fastener head that has multiple interconnected flat sides, the system comprising:

multiple secondary locks, each of the multiple secondary locks arranged concentrically outside of a respective one of he fastener heads, each of the multiple secondary locks including, a lock inner peripheral surface that includes an even number of flat wall segments that are interconnected with each other and that can engage the respective fastener head for preventing rotation of the secondary lock upon the fastener head;

a lock outer peripheral surface that includes an odd number of teeth extending away from the lock inner peripheral surface so that groups of teeth that are radially aligned with each of the flat wall segments of lock inner peripheral surface are arranged differently than groups of teeth that are radially aligned with adjacent flat wall segments on opposing sides thereof; and a retaining ring that has a lower surface that engages upper surfaces of all of the multiple secondary locks so that the retaining ring prevents upward movement of the multiple secondary locks;

wherein portions of some of the teeth of the secondary locks extend outwardly beyond the retaining ring such that less than one-half of the length of each of the teeth of the secondary locks extends outwardly beyond the retaining ring.

16. A system for preventing rotation of multiple fasteners for securing a steering arm to a steering kingpin, the multiple fasteners extending parallel to and spaced from each other and arranged in a generally circular pattern and extending through the steering arm and are operably coupled to an end of the steering kingpin, each of the multiple fasteners including a fastener head that includes multiple flat sides that are interconnected at multiple fastener outside corners, the fastener head defining a fastener head maximum width, the system comprising:

multiple secondary locks that engage the multiple fasteners so that each of the multiple secondary locks is arranged concentrically outside of a respective one of the multiple fasteners, each of the multiple secondary locks including, a lock inner peripheral surface that has an even number of flat wall segments that are interconnected at multiple lock inside corners, the lock inner peripheral surface defining a lock inner peripheral axis of symmetry that extends through a pair of the lock inside corners on opposing sides of the secondary lock, the flat wall segments of the lock inner peripheral surface extending about a lock central opening that is provided in a central portion of the secondary lock, the lock inner peripheral surface defining a minimum width of the lock central opening that is greater than the fastener head maximum width so that the secondary lock can be rotated upon the fastener head such that at least one of the lock inside corners is misaligned with an adjacent relatively nearest one of the fastener outside corners by a distance that is greater than one-half of a width of each of the multiple teeth of the secondary lock and so that the secondary lock can be rotationally clocked back and forth upon the fastener head so as to sweep a distance that is greater than one-half of the width of each of the multiple teeth of the secondary lock;

a lock outer peripheral surface that includes an odd number of teeth, each of the teeth extending from a central axis of the secondary lock in a radial direction, the secondary lock teeth of adjacent pairs of the multiple secondary locks engaging each other so as to prevent rotation of the multiple fasteners, the lock outer peripheral surface defining a lock outer peripheral axis of symmetry that is different from the lock inner peripheral axis of symmetry such that groups of teeth that are radially aligned with each of the flat wall segments of lock inner peripheral surface are arranged differently than groups of teeth that are radially aligned with adjacent flat wall segments on opposing sides thereof.

\* \* \* \* \*